(12) United States Patent
Dietz et al.

(10) Patent No.: US 12,480,572 B2
(45) Date of Patent: Nov. 25, 2025

(54) TRANSMISSION

(71) Applicant: Flender GmbH, Bocholt (DE)

(72) Inventors: Katrin Dietz, Essen (DE); Pascal Hessling, Bocholt (DE); Tim Vossschmidt, Gelsenkirchen (DE)

(73) Assignee: Flender GmbH, Bocholt (DE)

( * ) Notice: Subject to any disclaimer, the term of this patent is extended or adjusted under 35 U.S.C. 154(b) by 350 days.

(21) Appl. No.: 18/020,879

(22) PCT Filed: Aug. 9, 2021

(86) PCT No.: PCT/EP2021/072198
§ 371 (c)(1),
(2) Date: Feb. 10, 2023

(87) PCT Pub. No.: WO2022/034040
PCT Pub. Date: Feb. 17, 2022

(65) Prior Publication Data
US 2023/0304475 A1    Sep. 28, 2023

(30) Foreign Application Priority Data

Aug. 11, 2020 (EP) ..................................... 20190590

(51) Int. Cl.
| F16H 57/04 | (2010.01) |
| F16H 57/00 | (2012.01) |
| F03D 15/00 | (2016.01) |

(52) U.S. Cl.
CPC ..... *F16H 57/0431* (2013.01); *F16H 57/0025* (2013.01); *F03D 15/00* (2016.05);
(Continued)

(58) Field of Classification Search
CPC ............. F16H 57/0025; F16H 57/0431; F16H 57/0479; F16H 57/043; F16H 57/0486;
(Continued)

(56) References Cited

U.S. PATENT DOCUMENTS

| 11,493,124 B2* | 11/2022 | De Laet | F16H 57/0456 |
| 2006/0068961 A1* | 3/2006 | Haka | F16H 57/0479 |
| | | | 475/159 |

(Continued)

FOREIGN PATENT DOCUMENTS

| DE | 39 03 253 A1 | 8/1989 |
| DE | 10 2010 060 147 | 4/2012 |

(Continued)

OTHER PUBLICATIONS

International Search Report issued on Oct. 19, 2021 by the European Patent Office in International Application PCT/EP2021/072198.

*Primary Examiner* — Timothy Hannon
(74) *Attorney, Agent, or Firm* — Henry M. Feiereisen LLC

(57) ABSTRACT

A transmission includes a shaft-hub connection designed as a serration and having an axial extent along a shaft axis, and an oil supply line to the serration in order to lubricate a relative movement in the serration between a shaft side and a hub side of the shaft-hub connection. The oil supply line is designed to open from radially inward directly into a cavity on the serration to enable supply of oil to the serration at an oil pressure that prevails in the cavity.

16 Claims, 6 Drawing Sheets

(52) U.S. Cl.
CPC . *F05B 2260/40311* (2013.01); *F05B 2260/98* (2013.01); *F16H 57/0486* (2013.01)
(58) Field of Classification Search
CPC ........ F16H 57/0482; F05B 2260/40311; F05B 2260/98; F03D 15/00; F16D 1/0876; F16D 2300/06
See application file for complete search history.

(56) References Cited

U.S. PATENT DOCUMENTS

| | | | |
|---|---|---|---|
| 2006/0207370 A1* | 9/2006 | Hedman | F16H 57/0482 74/468 |
| 2010/0007151 A1 | 1/2010 | Ciszak et al. | |
| 2010/0160104 A1 | 6/2010 | Dinter et al. | |
| 2013/0017916 A1* | 1/2013 | Sada | B60L 50/61 475/5 |
| 2016/0223073 A1 | 8/2016 | Deitmers et al. | |
| 2016/0290480 A1* | 10/2016 | Sada | F16H 57/0447 |
| 2017/0307064 A1* | 10/2017 | Riedisser | F16H 57/0427 |
| 2018/0135740 A1* | 5/2018 | Kodama | F16H 57/043 |
| 2018/0274663 A1 | 9/2018 | Hepermann | |

FOREIGN PATENT DOCUMENTS

| | | |
|---|---|---|
| DE | 10 2011 002 904 A1 | 7/2012 |
| DE | 10 2012 202 454 A1 | 8/2013 |
| DE | 11 2012 000 277 | 9/2013 |
| DE | 10 2013 217 950 A1 | 3/2016 |
| DE | 10 2015 216 369 A1 | 3/2017 |
| DE | 10 2015 217 906 A1 | 3/2017 |
| EP | 2 199 607 A2 | 6/2010 |
| EP | 2 280 193 A2 | 2/2011 |
| EP | 2 597 307 A2 | 5/2013 |

\* cited by examiner

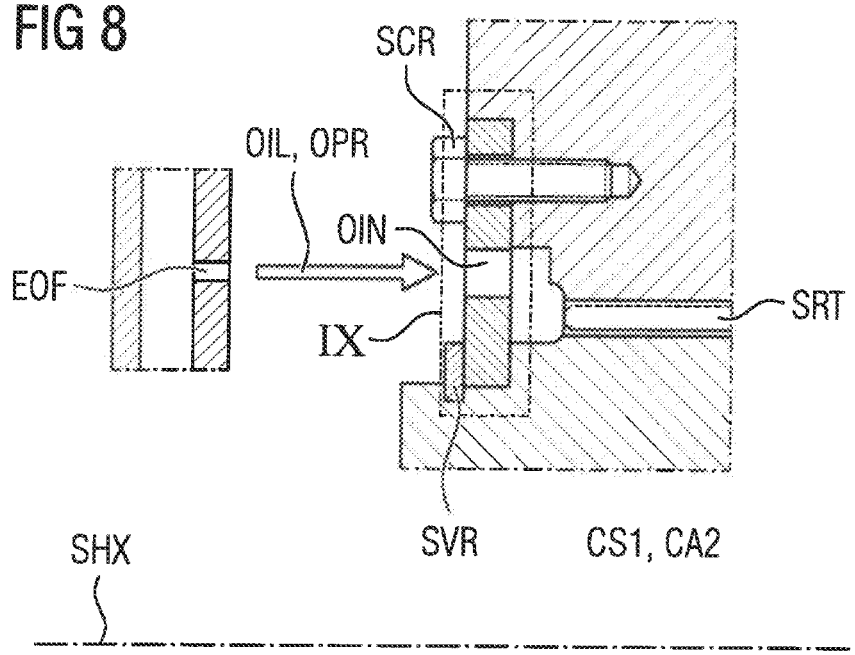
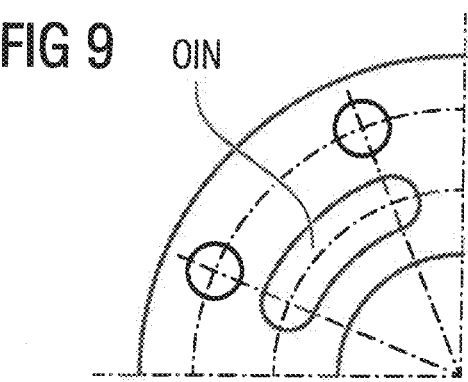

TRANSMISSION

CROSS-REFERENCES TO RELATED APPLICATIONS

This application is the U.S. National Stage of International Application No. PCT/EP2021/072198, filed Aug. 9, 2021, which designated the United States and has been published as International Publication No. WO 2022/034040 and which claims the priority of European Patent Application, Serial No. 20190590.8, filed Aug. 11, 2020, pursuant to 35 U.S.C. 119(a)-(d).

BACKGROUND OF THE INVENTION

The invention relates to a transmission having a shaft-hub connection which is formed as a serration and has an axial extent along a shaft axis, wherein an oil supply line of the serration is provided in order to lubricate relative movements occurring in the serration between a shaft side and a hub side of the shaft-hub connection.

A transmission of the type defined at the outset is already known from EP 2 199 607 A2.

A spray oil supply for a planetary transmission is already known from DE 10 2012 202 454 A1.

Documents EP 2 597 307 A3 and US 2010/007 151 A2 disclose a wind turbine having a transmission and a double-walled pitch tube with an outer and an inner tube. Here, the cavity formed between the inner and the outer tube serves for the supply of lubricant. The electrical lines run through the inner tube.

DE 10 2015 217 906 A1 discloses a planetary transmission in which splines between a planet carrier and a sun shaft are supplied with oil through the planet carrier from radially outside.

It is known from DE 10 2015 216 369 A1 to couple a planetary transmission to a generator via a toothed coupling, wherein the toothed coupling is supplied with oil from radially outside via a radially inwardly open groove extending radially outside of the toothed coupling.

DE 10 2013 217 950 A1 discloses a planetary transmission for a wind turbine in which splines between a planet carrier and a sun shaft are supplied with oil via an axially extending channel which is fed from radially outside and which is formed between the planet carrier and the sun shaft.

EP 2 280 193 A2 discloses a planetary transmission having a toothed coupling which is supplied with lubricant via a nozzle from a lubricant supply channel extending axially radially outside the toothed coupling.

In the case of relevant plants—for example planetary transmissions on wind turbines—it is always an important requirement to reduce the installation space of the transmission. In this respect, configuring a shaft-hub connection as a serration is frequently an efficient solution. This connection requires adequate lubrication because relative movements occur between the materials in contact that in the medium and long term can lead to destruction of the connection with inadequate lubrication. Conventionally, a spray oil supply is frequently provided for this purpose such that in particular surface tensions of the lubricant ensure a creep flow through the gap of the serration. However, observations have revealed that a sufficient lubrication frequently cannot be produced by such a lubricant supply. The expression "serration" is relevantly also frequently referred to as "involute splines".

A spray oil supply is additionally space-consuming, utilizes the available oil volume in a not very efficient manner—such that a relatively high oil consumption occurs—and also requires further conditions (no contamination, no other disturbing influences—such as, for example, opposing pressure differences).

Starting from the problems and disadvantages of the prior art, the object of the invention is to develop a transmission of the type defined at the outset in such a way that the problems and disadvantages discussed are avoided.

SUMMARY OF THE INVENTION

The object is achieved according to the invention by a transmission as set forth hereinafter. In addition, the invention proposes a method for simulation and a corresponding computer program product. The respective dependent subclaims contain advantageous developments of the invention.

Terms such as radial, tangential or circumferential direction refer in each case to the first axis of rotation, or, if correspondingly indicated, to a respective second axis of rotation.

The transmission according to the invention is distinguished by the fact that a high degree of operational reliability is ensured because the shaft-hub connection in the form of a serration, owing to the oil supply according to the invention with an oil supply line from radially inward directly into a cavity on the serration, ensures a reliable supply of oil at the oil pressure prevailing in the cavity.

Since the serration of the shaft-hub connection can be supplied with oil not from radially outward, but from radially inward, it is possible to functionalize the rotation of the shaft of the shaft-hub connection for the oil delivery. The oil delivery via the oil supply line to the cavity can be guided through the rotating shaft and thereby be exposed to centrifugal forces imparted by the shaft. As a result, it is possible that the oil is delivered into the cavity via the oil supply line at least partially driven by centrifugal force, preferably exclusively driven by centrifugal force. As a result, it is possible to build up an oil pressure provided in the cavity with centrifugal force assistance. The oil mass flow delivered for the lubrication of the serration of the shaft-hub connection and/or the oil pressure in the cavity can at least partially be rotational speed-dependent. At a high rotational speed when a greater relative movement can occur in the shaft-hub connection, the lubrication is automatically increased. At a low rotational speed when a less great relative movement can occur in the shaft-hub connection, an unnecessarily strong lubrication is avoided and can be limited to the required minimum. This makes it possible without additional auxiliary means to have a lubrication of the serration in the shaft-hub connection that is optimized to the current operating conditions.

The shaft-hub connection has a shaft and a hub which is coupled in a torque-transmitting manner via the serration, wherein the shaft and the hub of the shaft-hub connection are in particular substantially relative immovable with respect to one another in the axial direction. For example, the hub is fixed in the axial direction relative to the shaft between a shoulder of the shaft and a securing element, which is configured in particular as a securing ring, possibly with a clearance fit. The axial extent of the shaft and of the hub is preferably greater than the axial extent of the serration. With particular preference, the hub projects beyond the axial extent of the serration in the axial direction, wherein the part of the hub projecting beyond the serration covers the shaft. As a result, an annular gap formed axially next to the serration is provided between the hub and the shaft, into which annular gap the oil supply line can open from radially inward. The oil supplied from the oil supply line from radially inward can be easily deflected in the axial direction within the annular gap in order to be able to lubricate the serration of the shaft-hub connection over the entire axial extent. The annular gap can form the cavity communicating with the oil supply line, wherein in particular the cavity projects beyond the radial extent of the serration in the radiation direction. Preferably, the cavity can extend further radially inward into the shaft than a root circle radius of an outer toothing of the serration that is formed by the shaft.

In particular, the oil supply line is formed in a shaft of the shaft-hub connection. The oil supply line, which is formed for example as at least one radially extending bore in the shaft of the shaft-hub connection, can thereby sling the oil radially outward into the cavity with centrifugal force assistance and build up a corresponding oil pressure in the cavity. In addition, the shaft of the shaft-hub connection can project from the serration of the shaft-hub connection in both axial directions, for example in order to drive further transmission components and/or to be mounted in a simple manner. For example, an end-side shaft end of the shaft of the shaft-hub connection can be received and mounted in a pilot bearing without an oil supply of the serration of the shaft-hub connection having to extend over a channel running along the end side of the shaft.

There is preferably provision that the shaft of the shaft-hub connection at least partially delimits an axially extending supply channel communicating with the oil supply line. The supply channel can be formed for example as a bore and/or annular gap. The oil which is guided in the supply channel to the oil supply line and finally into the cavity and to the serration can be entrained by the surface delimiting the supply channel, with the result that the oil guided in the supply channel to the oil supply line can be influenced by centrifugal force. When the oil in the supply channel strikes the radially extending oil supply line, the oil, as a result of the acting centrifugal forces, can be conveyed radially outward, in particular slung radially outward, via the oil supply line.

With particular preference, the supply channel, which in particular forms an annular flow cross section, is limited radially inwardly by a pitch tube which preferably corotates with the shaft of the shaft-hub connection. The shaft of the shaft-hub connection can be configured as a hollow shaft into which the pitch tube can be plugged at a distance in the radial direction with the formation of the supply channel, which is in particular substantially annular. A relative rotational speed can be provided between the pitch tube and the shaft of the shaft-hub connection, in particular if the pitch tube is designed to be nonrotatable and rotationally fixed. The pitch tube is preferably connected to the shaft in a rotationally fixed manner, with the result that both the shaft and the pitch tube can impart centrifugal forces on the oil in the supply channel. In this variant, the shaft of the shaft-hub connection can, with the aid of the connected pitch tube, form in particular a double-walled pitch tube.

An advantageous development provides that the cavity is arranged at an axial end of the serration. In this way, the oil flows from one axial end to the other axial end through the meandering gap which is formed by the serration and which extends in the circumferential direction.

Another preferred development of the invention provides that the cavity is arranged in a central axial region of the serration such that at least 20% of the remaining axial extent of the serration is situated on both sides of the cavity. In this way, the efficiency of the oil quantity supplied is particularly high.

In a particularly expedient embodiment of the invention, the transmission is formed as an, in particular multistage, planetary gear mechanism, wherein the planetary gear mechanism has at least one annulus, at least two planetary gears on at least one web shaft and at least one central gear on a central shaft, wherein the serration is provided as a force-transmitting connection between the central gear and the central shaft. The components referred to as upper running gears are also frequently referred to as planet gears. The component referred to as a central gear is also frequently referred to as a sun gear. The web shaft is also frequently referred to as a planet carrier.

In particular, there is provision that the planetary gear mechanism is of multistage design, wherein a first planetary gear mechanism stage at least comprises: a first annulus, first planetary gears on at least a first web shaft and a first central gear on a first central shaft, wherein a second planetary gear mechanism stage at least comprises: at least a second annulus, second planetary gears on at least a second web shaft and a second central gear on a second central shaft, wherein the first central gear is coupled to the first central shaft by means of the serration, wherein the first central shaft and the second web shaft are at least connected to one another in a rotationally fixed manner, wherein at least one planetary gear mechanism stage is formed with an oil supply line to a serration according to the invention. Here, the hollow toothing which is customary in planetary gear mechanisms is a constituent part of the stator. The two planetary gear mechanisms are each arranged in series, wherein, starting from the drive (wind blade of the wind turbine), a torque is introduced into the first web shaft which transmits the power to a first central gear by means of planetary gears. The first central gear transitions into the second web shaft, wherein the transition from the first central gear to the second web shaft can be considered to be formed by the serration. Accordingly, the second web shaft can essentially also be referred to as the first central gear. Such a multistage construction can be theoretically continued in a virtually arbitrary manner.

With particular preference, the oil supply line is arranged in or on the central shaft. In this way, the oil can be supplied to the serration without further transition at a relative rotational speed.

An advantageous development provides that the oil supply line is supplied with oil by means of an oil supply from a stator of the transmission, wherein the oil supply has a shaft seal-sealed annular chamber between the stator and the shaft of the shaft-hub connection, in particular the central shaft. Such a bridging operates reliably and permanently at a resulting relative rotational speed in the oil flow.

The stator of the transmission is understood to be a nonrotating component which is fixed in terms of movement and which is, for example, a transmission housing or a transmission component which is directly or indirectly connected to the transmission housing in a rotationally fixed manner.

Another possibility according to the invention for the oil supply of the serration provides that the oil supply line is supplied with oil by means of an oil supply on a stator of the transmission, wherein the oil supply has at least one outlet opening which is arranged opposite at least one inlet opening, which extends in the circumferential direction of the circular movement of the central shaft, in the cavity at an axial end of the serration such that, during operation, an oil jet from the outlet opening can enter the at least one inlet opening at least in certain circular movement phases. In this way, the supply of the serration with lubricating oil, on the one hand, and the bridging of a relative rotational speed with the oil flow, on the other hand, can be integrated in a single module.

A preferred application of the invention lies in the field of wind turbines. Here, a possible development of the invention is a transmission according to the invention for a wind turbine, the nacelle of a wind turbine comprising a transmission according to the invention, or a wind turbine having a transmission according to the invention. Here, the "transmission according to the invention" relates either to a combination of features according to the main claim or to a combination of features defined by the back references of the patent claims. Particularly expedient here is a bladed rotor of the wind turbine connected to the first web shaft of the transmission in a force-transmitting manner.

An advantageous development of the wind turbine provides that a pitch adjustment device is provided on the bladed rotor, wherein the pitch adjustment device is controlled by means of control lines, wherein the control lines form a line connection with the oil supply to the oil supply line. The line connection can advantageously be formed here as a "double-walled pitch tube" in such a way that the control line for the pitch adjustment device (as a rule electrical lines) are routed through the central tube and an oil supply is provided in the intermediate region between the outer tube and the inner tube, which oil supply also supplies the serration with oil in the manner according to the invention.

The invention also relates to a computer-implemented method for simulating a transmission according to at least one combination of features defined by the claims and/or a wind turbine according to at least one combination of features defined by the claims. Accordingly, the invention comprises, on the one hand, the physical structure having the features according to the invention and, on the other hand, also a digital twin, as is used, for example, for the purpose of simulating the arrangement or the operation of the arrangement by means of at least one computer. In addition, the invention also relates to a corresponding computer program product. The computer program product can have program code means which, when executed by a computer, carry out the method.

BRIEF DESCRIPTION OF THE DRAWING

The invention is described in more detail below on the basis of a specific exemplary embodiment for illustration. In the figures:

FIG. 8 shows a further variant of the oil supply for the serration in a schematic longitudinal sectional illustration, and FIG. 9 shows a further variant of the oil supply for the serration in a schematic longitudinal sectional illustration.

DETAILED DESCRIPTION OF PREFERRED EMBODIMENTS

Functionally identical components are partially provided with identical reference signs. Functionally identical components are partially not depicted in all of the figures nor are they separately repeatedly explained for each individual Figure. It is to be assumed in principle that these components each have a substantially identical function in the different illustrations.

Figure 1:
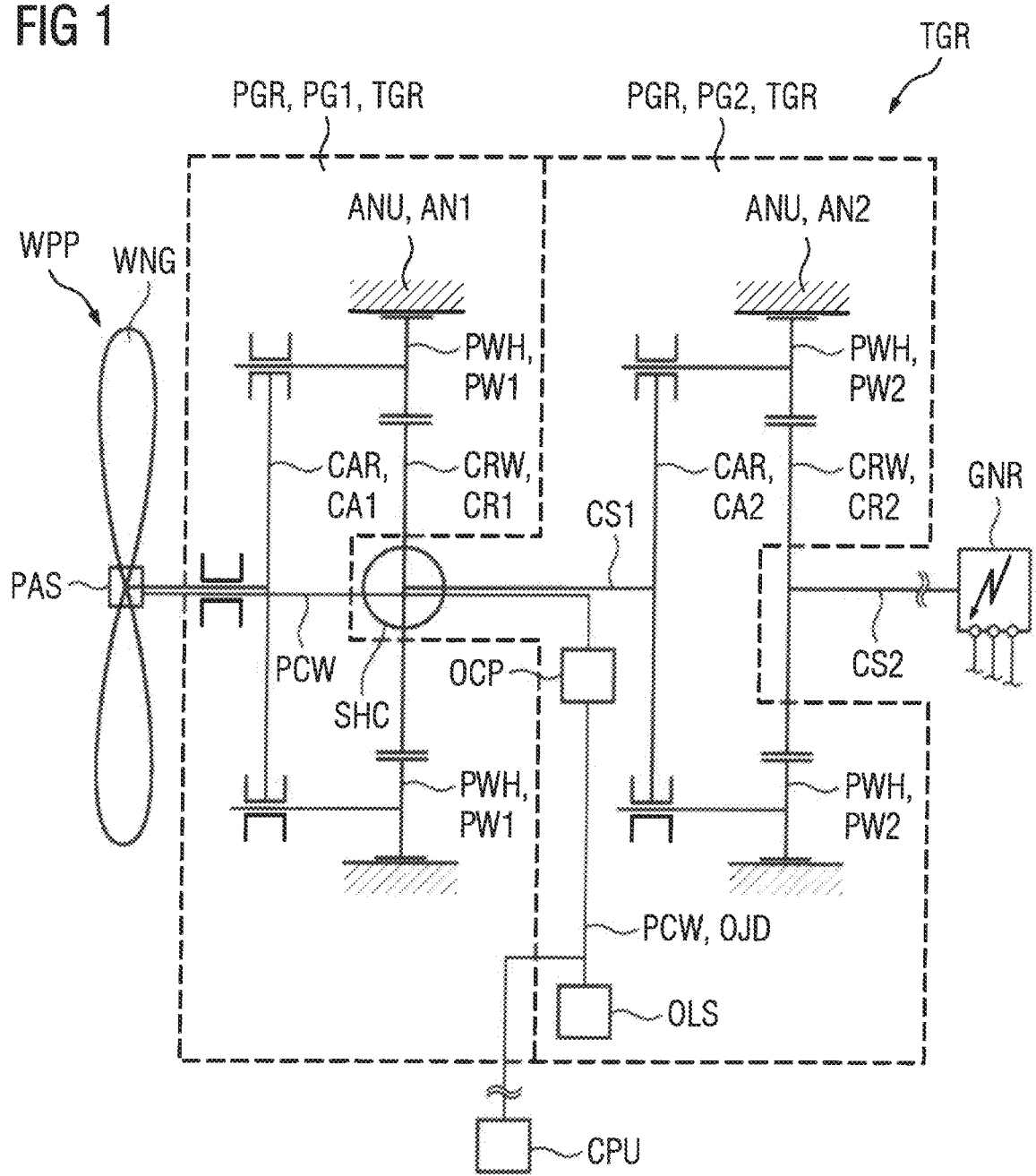
FIG. 1 shows a schematic, simplified illustration of a transmission according to the invention which is formed as a multistage planetary transmission of a wind turbine.
Figure 2:
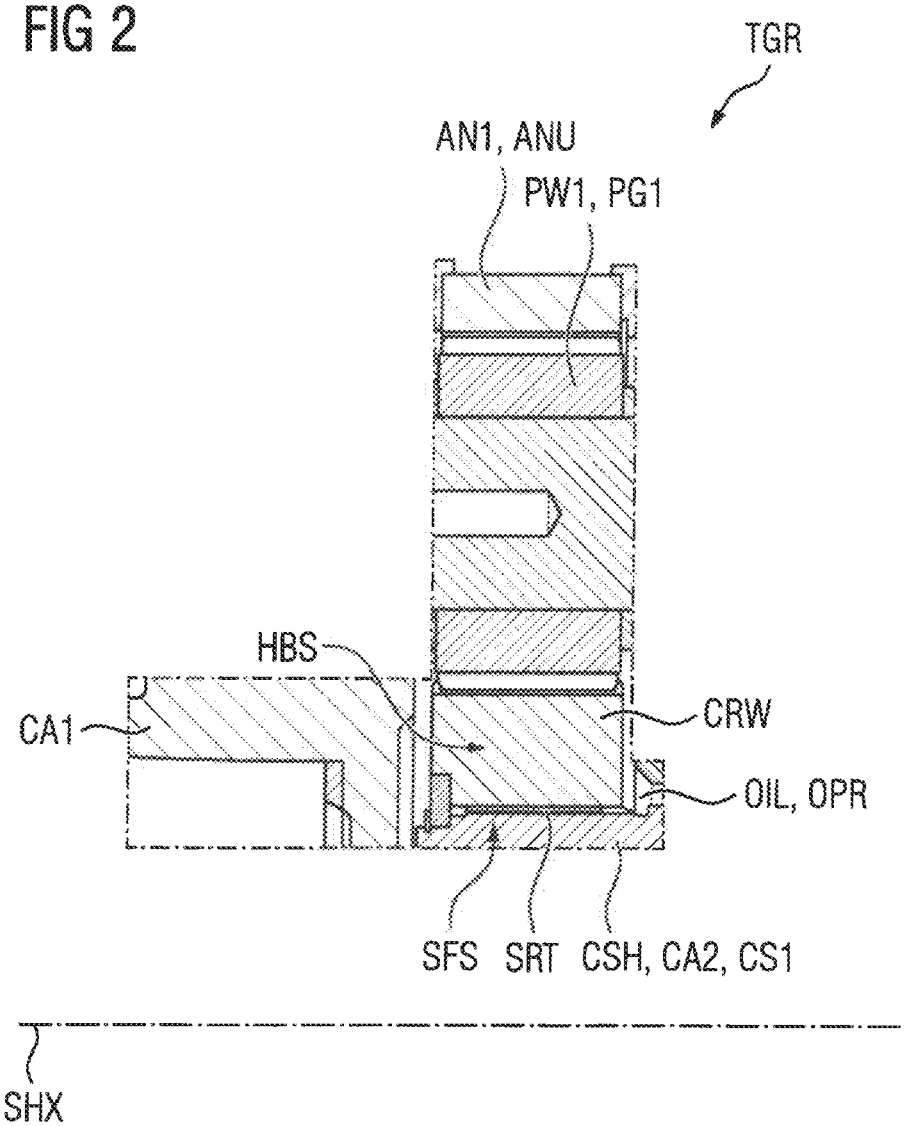
FIG. 2 shows a detail of a schematic longitudinal section through a transmission according to the invention.

FIG. 1 shows a schematic, simplified illustration of a transmission TGR according to the invention which is formed as a multistage planetary transmission or planetary gear mechanism of a wind turbine WPP. In principle, the respective planetary gear transmission PGR comprises at least one annulus ANU, at least two planetary gears PWH on at least one web shaft CAR and at least one central gear CRW on a central shaft CSH, wherein—as illustrated in other figures—a serration SRT according to the invention is provided as a force-transmitting connection between the central gear CRW and the central shaft CSH.

The illustrated transmission TGR is formed as a multistage planetary gear mechanism PGR. A first planetary gear transmission stage PG1 comprises: a first annulus AN1, first planetary gears PW1 on at least a first web shaft CA1 and a first central gear CR1 on a first central shaft CS1.

A second planetary gear mechanism stage PG1 comprises: at least a second annulus AN2, second planetary gears PW2 on at least a second web shaft CA2 and a second central gear CR2 on a second central shaft CS2. The first central gear CR1 is coupled to the first central shaft CS1 by means of the serration SRT, wherein the first central shaft CS1 and the second web shaft CA2 are at least connected to one another in a rotationally fixed manner. In the present case, the first central shaft CS1 and the second web shaft CA2 are formed as a common component.

The wind turbine WPP illustrated in FIG. 1 additionally comprises a generator GNR for power generation that is coupled to the 2nd central shaft CS2. A bladed rotor WNG of the wind turbine WPP is connected to the first web shaft CA1 of the transmission TGR in a force-transmitting manner. A pitch adjustment device PAS is provided on the bladed rotor WNG. The pitch adjustment device PAS is controlled by means of control lines PCW, wherein the control lines PCW form a line connection with the oil supply OCP to the oil supply line OLS. In a manner which is not illustrated but has already been explained above, this line connection is configured as a so-called "double-walled pitch tube". These control lines PCW connect the pitch adjustment device PAS to a central controller CPU.

FIGS. 2-8 each show different schematic illustrations of details of longitudinal sections through a multistage planetary gear transmission PGR formed as a transmission TGR according to the invention. The annuluses ANU, AN1, AN2 or the central axes thereof each extend here coaxially to the shaft axis SHX or to the axis of rotation of the respective central shaft CSH, CA1, CA2. In a manner which is not explained in more detail, the respective rotatable components are mounted rotatably with respect to one another or to a stator by means of rolling bearings or sliding bearings. Axes of rotation of planetary gears PW1 PW2 each extend parallel to the central axis of rotation SHX.

Between the central shaft CSH, CS1, CS2 and the central gear CRW, CW1, CW2 there is arranged a shaft-hub connection SHC which is formed as a serration SRT and which has an axial extent along a shaft axis SHX, wherein an oil supply line OLS of the serration SRT is provided in order to lubricate relative movements occurring in the serration SRT between a shaft side SFS and a hub side HBS of the shaft-hub connection SHC. The oil supply line OLS opens directly into a cavity CAV on the serration SRT such that the serration SRT can be supplied with the oil OIL at the oil pressure OPR prevailing in the cavity CAV.

Figure 3:
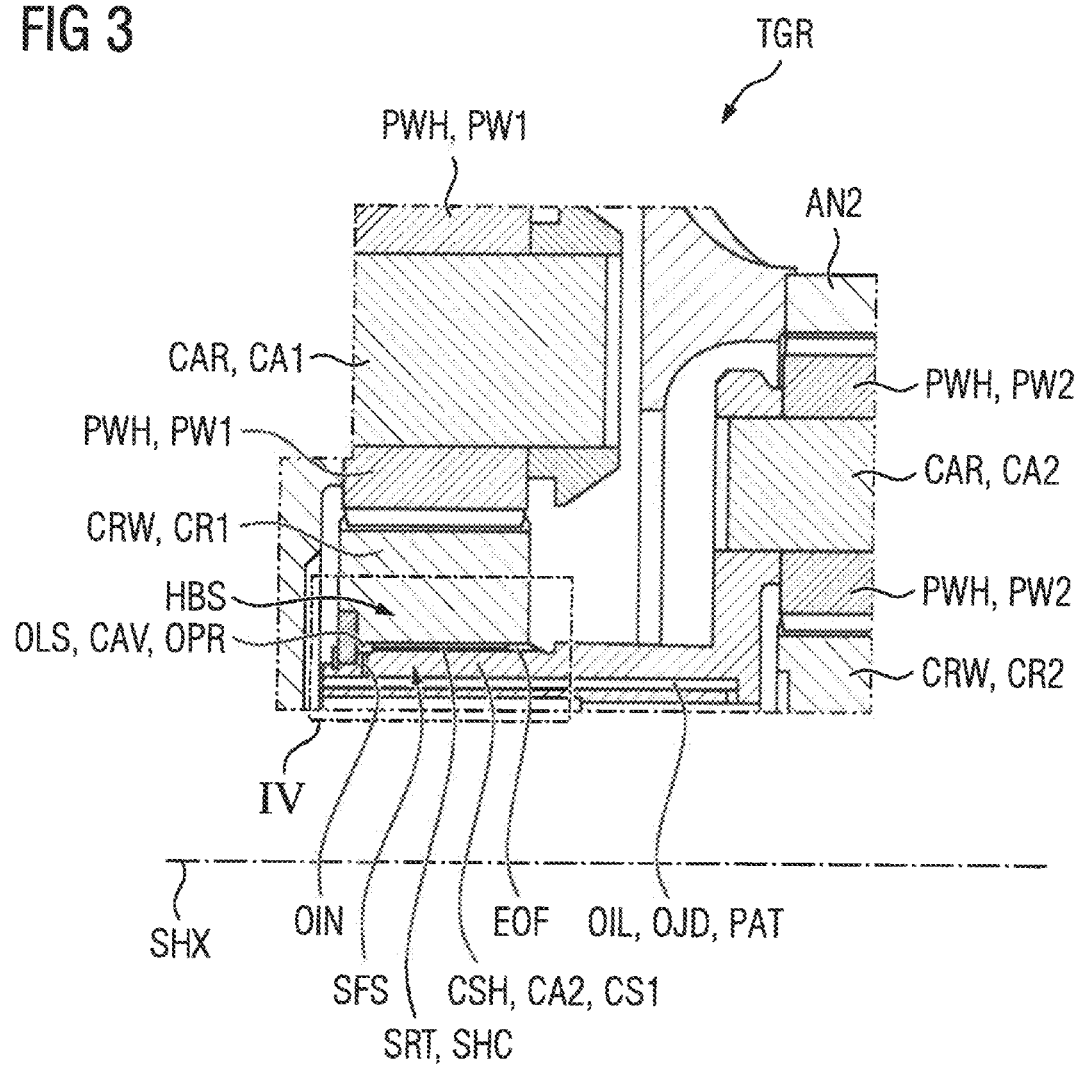
FIG. 3 shows a somewhat different detail than in FIG. 2 comprising further details of the oil supply for the serration.

FIG. 3 shows here how the double-walled pitch tube PAT is configured for transporting the oil OIL into the cavity CAV formed as an oil supply line OLS. The serration SRT is supplied with the oil pressure OPR from the cavity CAV.

Figure 4:
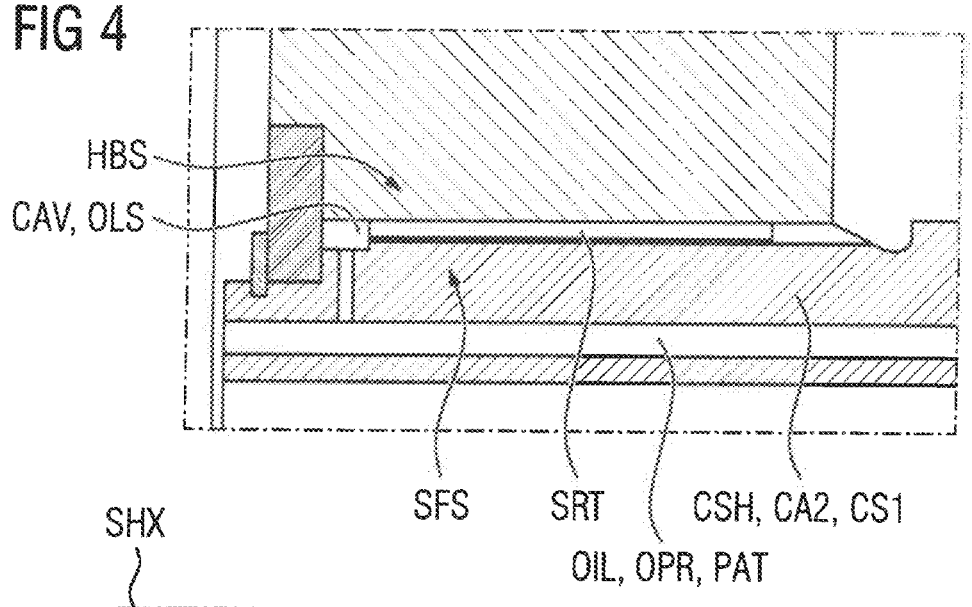
FIG. 4 shows a detail which is depicted as IV in FIG. 3.

In an enlarged detail illustration, FIG. 4 shows that the cavity CAV is arranged at the left axial end of the serration SRT such that the oil OIL flows through the gap of the serration SRT axially from left to right. Between the shaft of the shaft-hub connection HBS, in particular the central shaft CSH, and the pitch tube PAT, which is in particular connected to the central shaft CSH to form a double-walled pitch tube, there is formed a supply channel which is preferably formed as an annular gap and which communicates with the radially extending oil supply line OLS.

Figure 5:
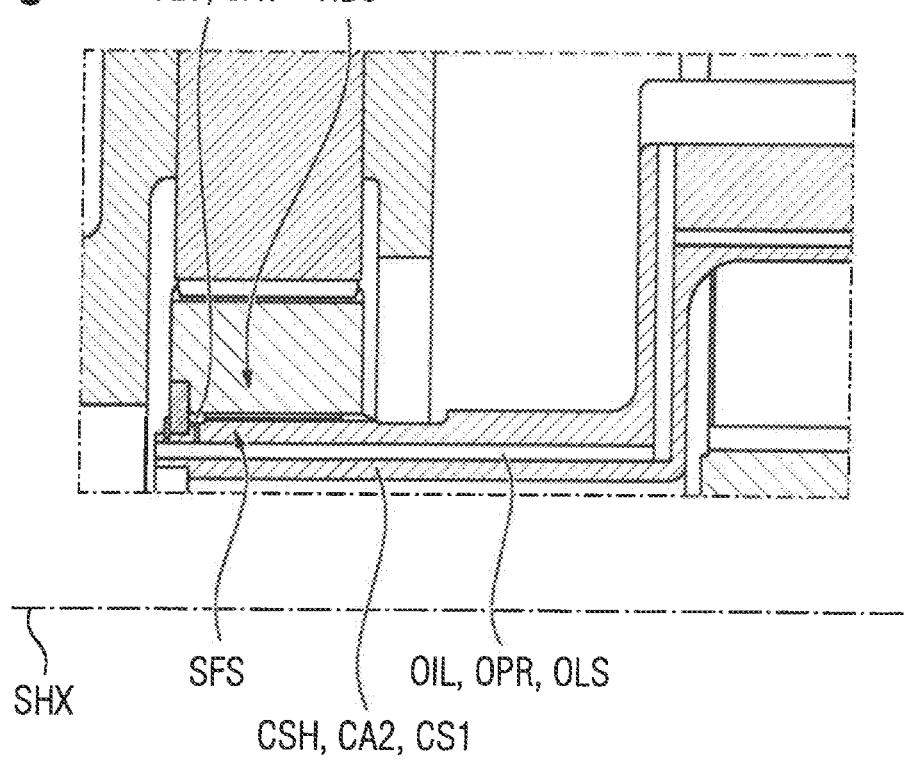
FIG. 5 shows a variant of the oil supply for the serration in a schematic longitudinal sectional illustration.
Figure 7:
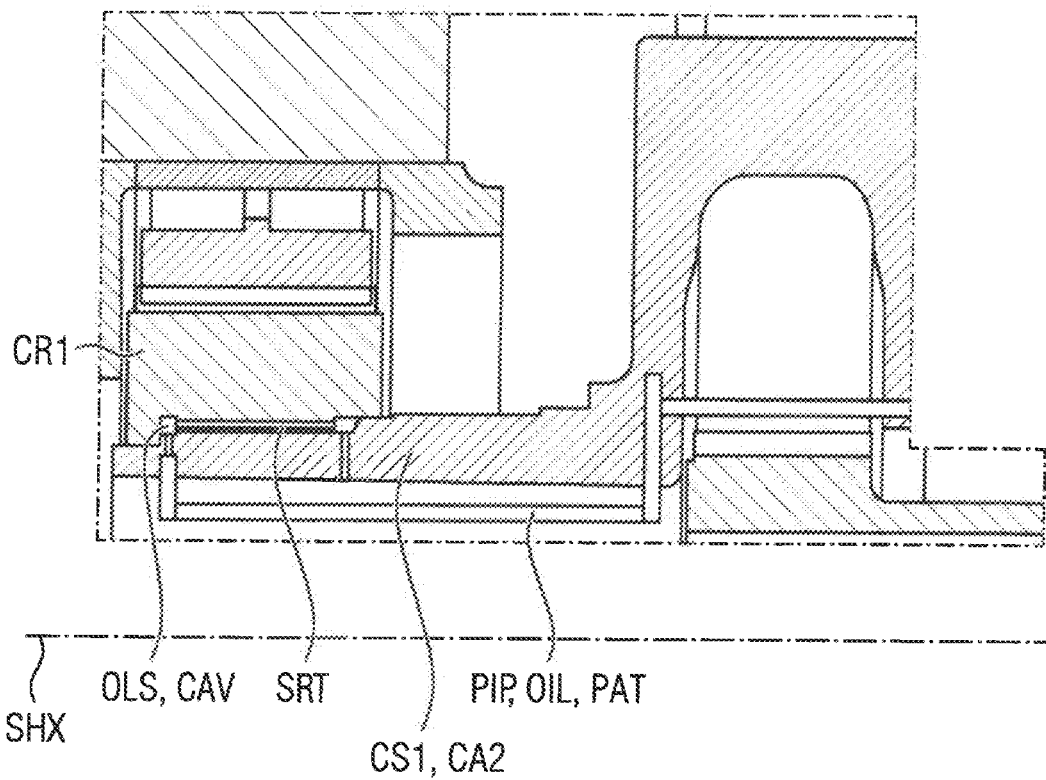
FIG. 7 shows another variant of the oil supply for the serration in a schematic longitudinal sectional illustration.

In a somewhat larger overview, FIG. 5 shows the path of the oil OIL through the double-walled pitch tube PAT starting from an oil supply OCP. The oil supply OCP can be formed as a shaft seal-sealed annular chamber (not shown), wherein, for example, a bronze bushing forms a seal, which operates as a sliding bearing, and defines a cavity of annular shape between the two relatively rotating components. FIGS. 7, 8, 9 each show variants of the oil supply OCP.

Figure 6:
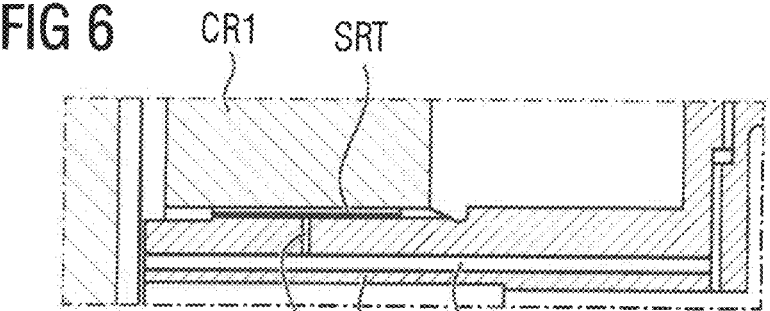
FIG. 6 shows a detail which is depicted as VI in FIG. 5.

FIG. 6 shows a detail of the oil supply line OLS into the cavity CAV on the serration SRT of FIG. 5 on an enlarged scale. By contrast thereto, FIG. 7 shows a variant in which the cavity CAV or the oil supply line OLS is arranged in the central region of the serration SRT between the two axial ends.

Whereas the preceding variants of the oil supply line OLS provide a supply of the oil OIL as channels integrated into components, FIG. 8 shows the possibility of mounting separate pipelines PIP on the corresponding components for the oil.

FIG. 9 shows that the oil supply line OLS is supplied with oil OIL by means of an oil supply OJD on a stator of the transmission TGR, wherein the oil supply OJD has one or more outlet openings EOF which are arranged opposite at least one inlet opening OIN, which extends in the circumferential direction of the circular movement of the central shaft CSH, in the cavity CAV at an axial end of the serration SRT such that, during operation, an oil jet from the outlet opening EOF can enter the at least one inlet opening OIN at least in certain circular movement phases.

What is claimed is:

1. A transmission, comprising:
a shaft-hub connection designed as a serration and having an axial extent along a shaft axis; and
an oil supply line to the serration in order to lubricate a relative movement in the serration between a shaft side and a hub side of the shaft-hub connection, said oil supply line designed to open from radially inward directly into a cavity on the serration to enable supply of oil to the serration at an oil pressure that prevails in the cavity, wherein a shaft of the shaft-hub connection at least partially delimits an axially extending supply channel communicating with the oil supply line, and the supply channel is delimited radially inwardly by a pitch tube which corotates with the shaft, and the shaft and the pitch tube form a double-walled pitch tube.

2. The transmission of claim 1, wherein the oil supply line is formed in the shaft of the shaft-hub connection.

3. The transmission of claim 1, wherein the supply channel forms an annular flow cross section.

4. The transmission of claim 1, wherein the cavity is arranged at an axial end of the serration.

5. The transmission of claim 1, wherein the cavity is arranged in a central axial region of the serration such that at least 20% of a remaining axial extent of the serration is situated on both sides of the cavity.

6. The transmission of claim 1, wherein the transmission is formed as planetary gear mechanism, said planetary gear mechanism comprising an annulus, a web shaft, at least two planetary gears mounted on the web shaft and meshing with the annulus, a central shaft, and a central gear on the central shaft, said serration providing a force-transmitting connection between the central gear and the central shaft.

7. The transmission of claim 6, further comprising a stator, said oil supply line being supplied with oil via an oil supply from the stator, wherein the oil supply includes a sealed annular chamber between the stator and the central shaft.

8. The transmission of claim 6, further comprising a stator, said oil supply line being supplied with oil via an oil supply on the stator, wherein the oil supply includes an outlet opening which is arranged opposite an inlet opening, which extends in a circumferential direction of a circular movement of the central shaft in the cavity at an axial end of the serration such that, during operation, an oil jet from the outlet opening is able to enter the inlet opening at least in certain circular movement phases.

9. The transmission of claim 1, further comprising a stator, said oil supply line being supplied with oil via an oil supply from the stator, wherein the oil supply includes a sealed annular chamber between the stator and a shaft of the shaft-hub connection.

10. The transmission of claim 1, further comprising a stator, said oil supply line being supplied with oil via an oil supply on the stator, wherein the oil supply includes an outlet opening which is arranged opposite an inlet opening, which extends in a circumferential direction of a circular movement of a shaft of the shaft-hub connection in the cavity at an axial end of the serration such that, during operation, an oil jet from the outlet opening is able to enter the inlet opening at least in certain circular movement phases.

11. The transmission of claim 1, wherein the pitch tube is connected to the shaft in a rotationally fixed manner, with the result that both the shaft and the pitch tube impart centrifugal forces on the oil in the supply channel.

12. A wind turbine, comprising a transmission, said transmission comprising a shaft-hub connection designed as a serration and having an axial extent along a shaft axis, and an oil supply line to the serration in order to lubricate a relative movement in the serration between a shaft side and a hub side of the shaft-hub connection, said oil supply line designed to open from radially inward directly into a cavity on the serration to enable supply of oil to the serration at an oil pressure that prevails in the cavity, wherein a shaft of the shaft-hub connection at least partially delimits an axially extending supply channel communication with the oil supply line, and the supply channel is delimited radially inwardly by a pitch tube which corotates with the shaft, and the shaft and the pitch tube form a double-walled pitch tube.

13. The wind turbine of claim 12, wherein the transmission is formed as a planetary gear mechanism which includes an annulus, a web shaft, at least two planetary gears mounted on the web shaft and meshing with the annulus, a central shaft, and a central gear on the central shaft, said serration providing a force-transmitting connection between the central gear and the central shaft.

14. The wind turbine of claim 13, further comprising a bladed rotor connected in a force-transmitting manner to the web shaft.

15. The wind turbine of claim 14, further comprising a pitch adjustment device provided on the bladed rotor and controlled via control lines, said control lines forming a line connection with an oil supply to the off supply line.

16. The wind turbine of claim 12, wherein the pitch tube is connected to the shaft in a rotationally fixed manner, with the result that both the shaft and the pitch tube impart centrifugal forces on the oil in the supply channel.

\* \* \* \* \*